(12) United States Patent
Shrivastava et al.

(10) Patent No.: US 10,820,227 B2
(45) Date of Patent: Oct. 27, 2020

(54) SYSTEM AND METHOD FOR MULTIMEDIA BROADCAST MULTICAST SERVICE (MBMS) COUNTING OPERATION

(71) Applicant: SAMSUNG ELECTRONICS CO., LTD., Suwon-si, Gyeonggi-do (KR)

(72) Inventors: Vinay Kumar Shrivastava, Bangalore (IN); Rohan Raj, Bangalore (IN); Shrinath Ramamoorthy Madhurantakam, Bangalore (IN); Swapnil Vinod Khachane, Bangalore (IN); Seung-Ri Jin, Bangalore (IN); Piyush Makhija, Bangalore (IN)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 16/325,622

(22) PCT Filed: Aug. 14, 2017

(86) PCT No.: PCT/KR2017/008845
§ 371 (c)(1),
(2) Date: Feb. 14, 2019

(87) PCT Pub. No.: WO2018/034473
PCT Pub. Date: Feb. 22, 2018

(65) Prior Publication Data
US 2019/0182699 A1    Jun. 13, 2019

(30) Foreign Application Priority Data

Aug. 14, 2016  (IN) .............................. 201641027771
Aug. 8, 2017   (IN) .............................. 201641027771

(51) Int. Cl.
*H04W 24/10*   (2009.01)
*H04W 4/06*    (2009.01)
(Continued)

(52) U.S. Cl.
CPC ............. *H04W 24/10* (2013.01); *H04W 4/06* (2013.01); *H04W 72/005* (2013.01);
(Continued)

(58) Field of Classification Search
CPC . H04W 24/10; H04W 72/0406; H04W 74/08; H04W 76/00; H04W 76/40; H04W 72/005; H04W 4/06; H04W 76/38
See application file for complete search history.

(56) References Cited

U.S. PATENT DOCUMENTS 8,811,325 B2 *  8/2014  Tang ................... H04W 52/146
                                                  370/329
2006/0030342 A1 *  2/2006  Hwang .................. H04N 21/21
                                                  455/466
(Continued)

FOREIGN PATENT DOCUMENTS

WO    WO 2015/1125901    8/2015

OTHER PUBLICATIONS

International Search Report for Application No. PCT/KR2017/008845.

*Primary Examiner* — Afshawn M Towfighi
(74) *Attorney, Agent, or Firm* — F. Chau & Associates, LLC

(57) ABSTRACT

The various embodiments of the present invention disclose a system and method for Multimedia Broadcast Multicast Service (MBMS) counting operation is described herein. A method for multimedia broadcast multicast service (MBMS) counting operation is disclosed. In an embodiment of the present application, the method comprises of receiving, by an user equipment (UE), an MBMS counting request from a wireless communication network; sending, by the UE, an MBMS counting response on a dedicated path to the network, if the UE is in connected mode; and triggering, by the
(Continued)

UE, a random access channel (RACH) procedure for sending the MBMS counting response, if the UE is in idle mode.

13 Claims, 5 Drawing Sheets

(51) Int. Cl.
*H04W 72/00* (2009.01)
*H04W 76/00* (2018.01)
*H04W 74/08* (2009.01)
*H04W 72/04* (2009.01)
*H04W 76/40* (2018.01)

(52) U.S. Cl.
CPC ....... *H04W 72/0406* (2013.01); *H04W 74/08* (2013.01); *H04W 76/00* (2013.01); *H04W 76/40* (2018.02)

(56) References Cited

U.S. PATENT DOCUMENTS

| | | | |
|---|---|---|---|
| 2012/0155364 A1 | 6/2012 | Kim et al. | |
| 2014/0335864 A1 | 11/2014 | Toyoda et al. | |
| 2015/0049662 A1* | 2/2015 | Kim | H04W 48/20 370/312 |
| 2015/0223035 A1 | 8/2015 | Lee et al. | |
| 2015/0230204 A1* | 8/2015 | Lin | H04W 76/10 370/312 |
| 2015/0230205 A1 | 8/2015 | Lin | |
| 2018/0049243 A1* | 2/2018 | Lee | H04W 72/0446 |

* cited by examiner

[Fig. 1]
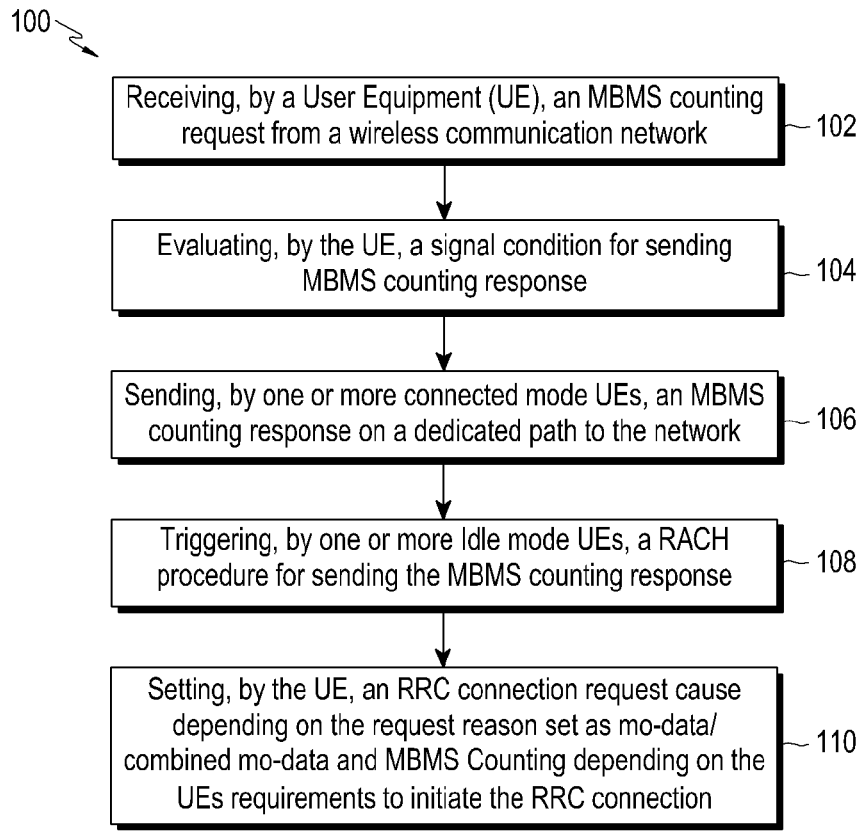
[Fig. 2]
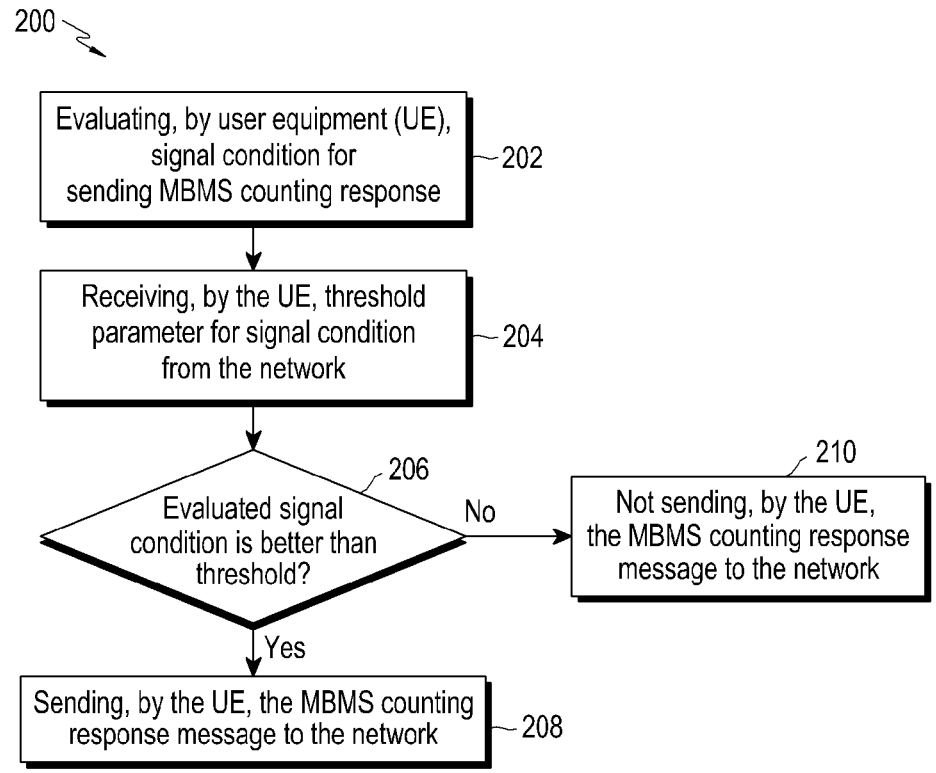

[Fig. 3]
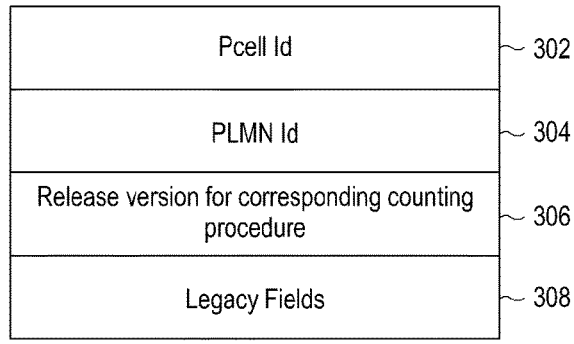
[Fig. 4]
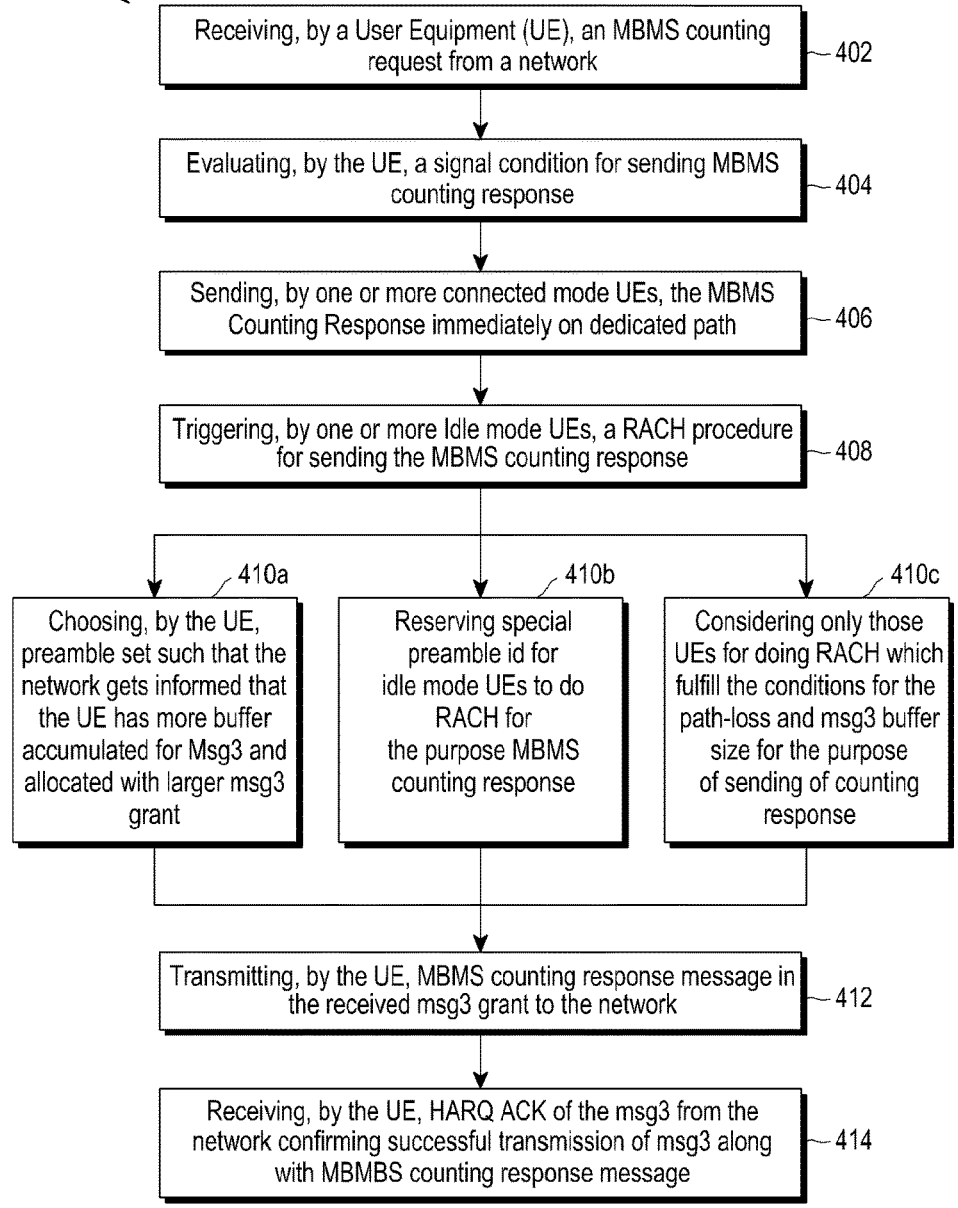

[Fig. 5a]
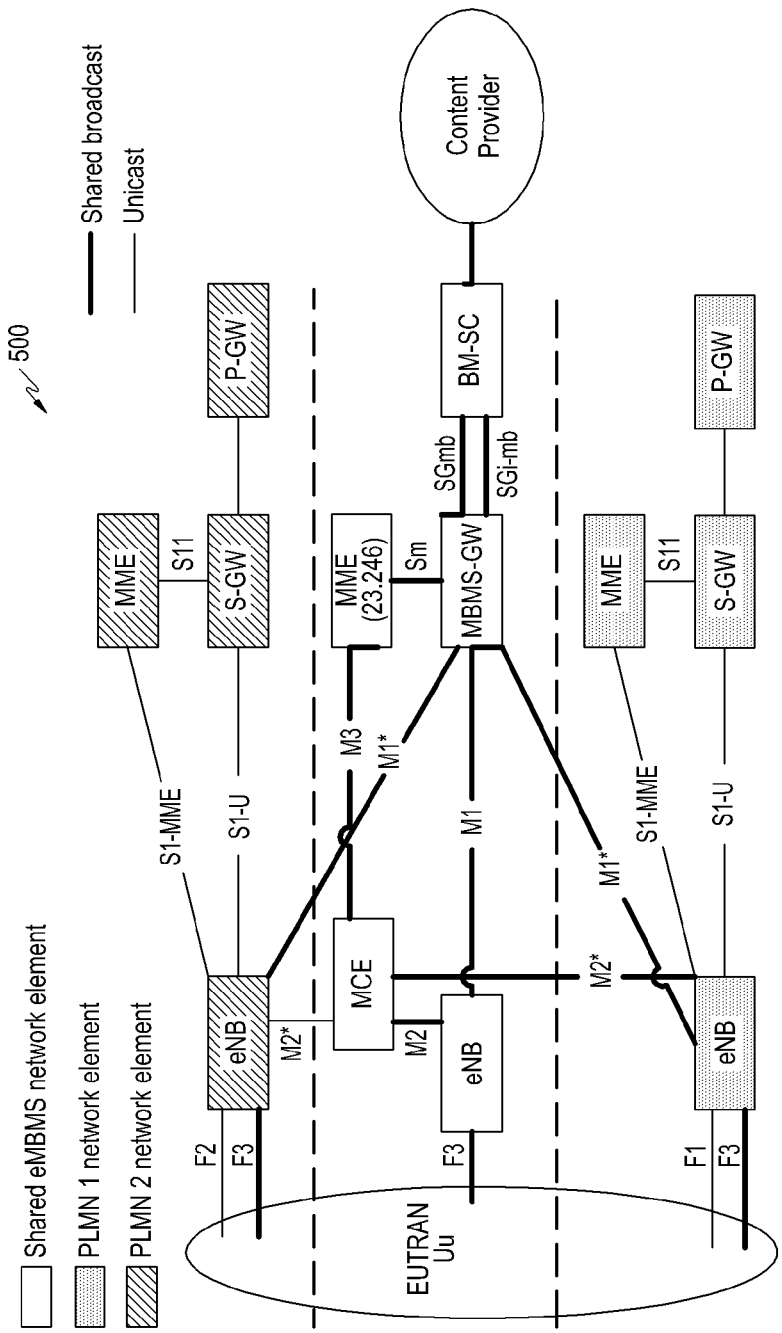

[Fig. 5b]
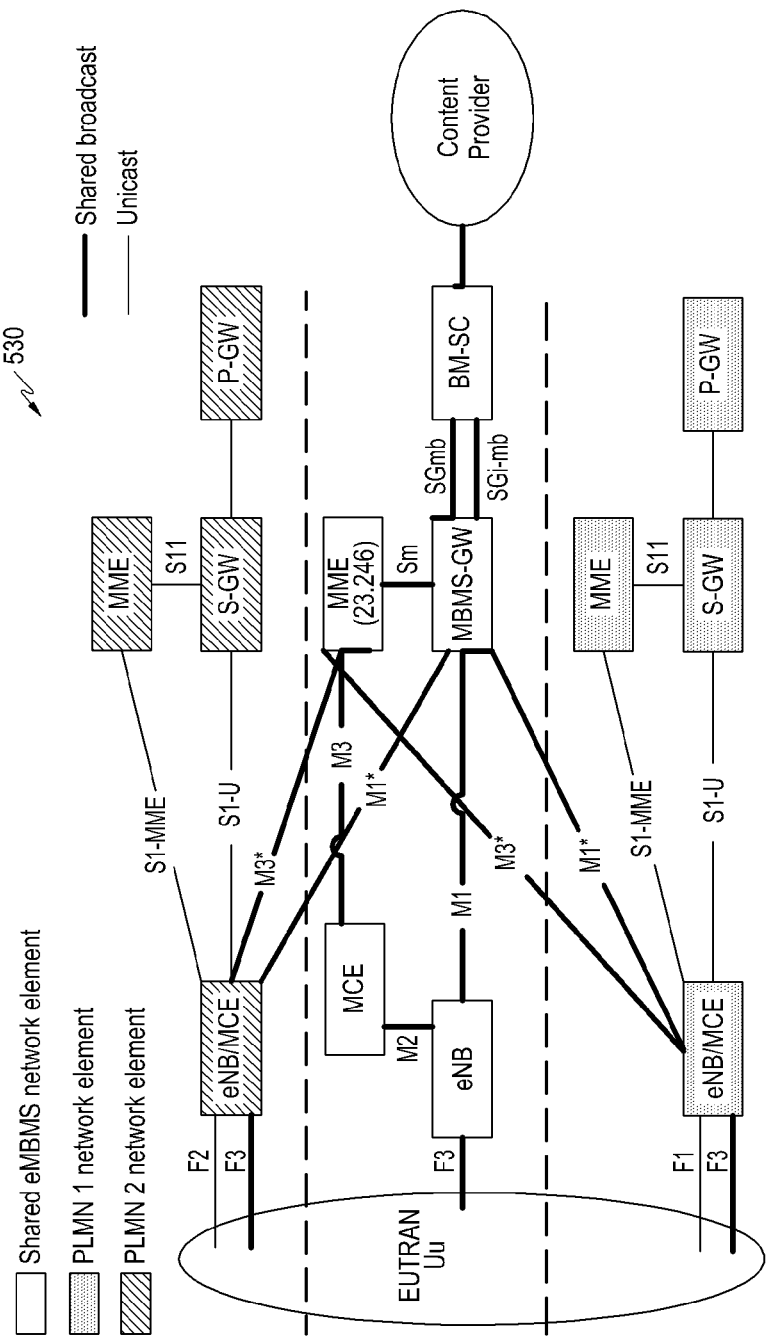

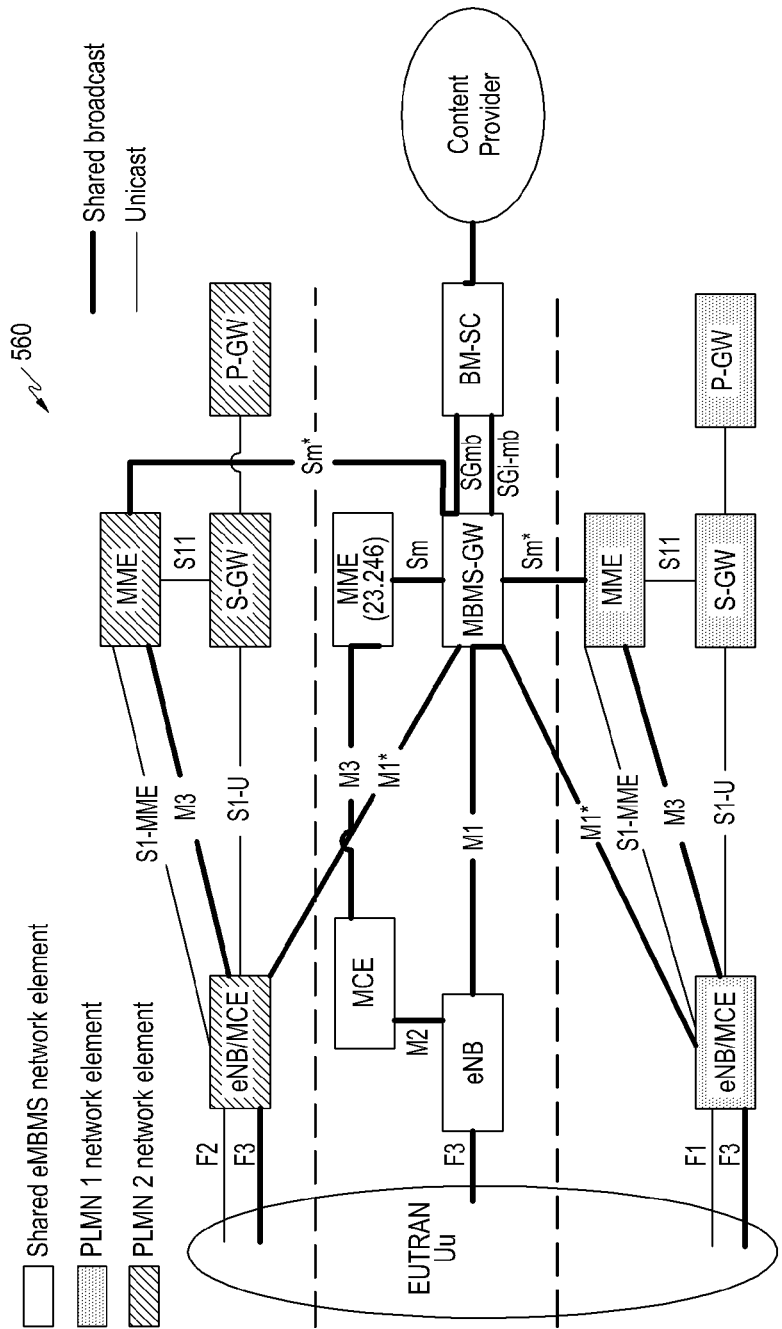
[Fig. 5c]

SYSTEM AND METHOD FOR MULTIMEDIA BROADCAST MULTICAST SERVICE (MBMS) COUNTING OPERATION

CROSS-REFERENCE TO RELATED APPLICATION

This application is a National Stage Entry of International Application No. PCT/KR2017/008845 filed Aug. 14, 2017, and which claims priority to Indian Provisional Patent Application Serial No. 201641027771 filed on Aug. 14, 2016, in the Indian intellectual Property Office, and to Indian Complete Patent Application Serial No. 201641027771 filed on Aug. 8, 2017 in the Indian Intellectual Property Office, the entire disclosure of each of which is incorporated herein by reference.

BACKGROUND

1. Filed

The present invention generally relates to wireless communication systems and more particularly, to a system and method for Multimedia Broadcast Multicast Service (MBMS) Counting operation.

2. Description of the Related Art

Evolved Multimedia Broadcast Multicast. Service (eMBMS) provides an efficient way to deliver download as well as streaming content to multiple users. Especially mobile video streaming is foreseen to generate a major volume of network data traffic in the future. Commercial deployments of eMBMS or "LTE Broadcast" are generating increasing interest. In order to meet the industry and operators' demand it is important to enhance eMBMS even further.

Many system and architecture solutions are being envisaged to meet requirements that is enabling widespread reach for television services across masses as well as to enhance and extend the limitations with the legacy systems. For example, previously MBMS system was limited to maximum 60% allocation for the radio resources as from the total 10 sub-frames available in a frame only 6 can be allocated for MBMS service transmission whereas other sub-frames were not allocated due to their possible support for the paging purpose. This limitation is being targeted in new system so that to enhance the allocation for MBMS services to up to 100%.

3GPP networks are looking at providing unicast and broadcast transport to support distribution of TV programs. It can support three types of TV services-Free-to-air (FTA), Free-to-view (FTV), and Subscribed services. Each type of the TV service has different requirements in order to meet regulatory obligations and public service and commercial broadcaster's requirements regarding content distribution.

One other enhancement objective is to provide wide coverage (Inter-Site distances of 15 KM and larger). This requires usage of longer cycle prefix for the OFDM (Orthogonal Frequency Division Multiplexing) and associated signaling procedures.

Another use case with using multi-carrier support for MBMS is where Mobile Network Operators have agreed that UEs subscribed to one network shall be able to receive certain MBMS service(s) from another network. One scenario is MBMS in a stadium where the stadium-related service should be received by UEs regardless to which network they are subscribed. Another scenario is a wide-area TV service provided over MBMS that shall be accessible by UEs regardless of subscription.

Potentially, different device configurations are possible that cater to different level of service operation. For instance, a "broadcast only device" which just receives MBMS service from a standalone MBMS carrier and does not support any other function. A possible use-case for this can be Television sets which can utilize standalone MBMS carrier reception to provide TV services to the users. Another category of the devices could be one which supports both reception of MBMS and unicast services with a single receiver and/or multiple receiver capability.

In order to serve different types devices, and different states of operation e.g. in idle mode or in connected mode, 3GPP is planning to develop primarily two solutions. One of the solutions is the standalone MBMS carrier approach as discussed earlier and it provides a cell which is 100% allocated for MBMS purpose and has self-contained MBMS signaling and system information messages. Devices on this standalone carrier can receive MBMS information in downlink. Notably there is no uplink transmission in the standalone MBMS carrier.

Other solution is providing MBMS services through a dedicated carrier (Secondary Cell, SCell) that is associated with the non-dedicated carriers (Primary Cells, PCells) of the receiving UEs. UE, therefore, receive MBMS services through dedicated MBMS cell and continues to receive unicast service and/or paging/system information from the serving cell (PCell) based on the idle or connected state of the device.

Many of the potential issues related to the new MBMS solution is not yet been addressed.

In view of the foregoing, there is a need for a system and method that addresses the herein above mentioned issues and problems and attempt to provide methods and solutions.

The above-mentioned shortcomings, disadvantages and problems are addressed herein and which will be understood by reading and studying the following specification.

SUMMARY

The various embodiments of the present invention disclose a system and method for enabling Multimedia Broadcast Multicast Service (MBMS) counting.

The various embodiments of the present invention disclose a system and method for Multimedia Broadcast Multicast Service (MBMS) counting operation.

BRIEF DESCRIPTION OF THE DRAWINGS

The other objects, features and advantages will occur to those skilled in the art from the following description of the preferred embodiment and the accompanying drawings in which:

FIG. 1 is a schematic flow diagram illustrating a method for enabling Multimedia Broadcast Multicast Service (MBMS) counting, according to an embodiment of the present invention.

FIG. 2 is a schematic flow chart illustrating a method for evaluating signal condition for sending MBMS counting response, according to an embodiment of the present invention.

FIG. 3 is a schematic diagram illustrating message format for MBMS counting response message, according to an embodiment of the present invention.

FIG. 4 is a schematic flow diagram illustrating a method for transmitting MBMS counting response message as part of random access channel (RACH) procedure, according to an embodiment of the present invention.

FIGS. 5a, 5b, and 5c are schematic diagrams illustrating data flow between network elements, according to an embodiment of the present invention.

Although specific features of the present invention are shown in some drawings and not in others, this is done for convenience only as each feature may be combined with any or all of the other features in accordance with the present invention.

DETAILED DESCRIPTION

According to an embodiment of the present invention, a method for multimedia broadcast multicast service (MBMS) counting operation, the method comprises receiving, by an user equipment (UE), an MBMS counting request from a wireless communication network; sending, by the UE, an MBMS counting response message on a dedicated path to the network, if the UE is in connected mode; and triggering, by the UE, a random access channel (RACH) procedure for sending the MBMS counting response message, if the UE is in idle mode.

Further, the method comprises of evaluating, by the UE, a signal condition for sending the MBMS counting response message, and wherein evaluating the signal condition comprises of comparing by the UE, the signal condition of a present signal with a preset threshold parameter received from the network; sending, by the UE, the MBMS counting response message to the network if the evaluated signal condition is more than the preset threshold parameter.

In an embodiment of the present invention, wherein the UE sets a radio resource control (RRC) connection request cause either as mobile originated (MO)-data or combined MO data-MBMS counting, depending on requirement of the UE to initiate a RRC connection, and wherein the RRC connection is released immediately after the network receives the MBMS counting response message, if the RRC connection is established only for the MBMS counting.

In an embodiment of the present invention, wherein the UE sets a radio resource control (RRC) connection request cause either as mobile originated (MO)-data or combined MO data-MBMS counting, depending on requirement of the UE to initiate a RRC connection, and wherein the RRC connection is released based on a data inactivity period, if the RRC connection is established not only for MBMS counting.

In an embodiment of the present invention, wherein the UE triggers the RACH procedure by sending a preamble set to indicate the network that the UE has enough buffer size accumulated for a Msg3 and is therefore allocated with a larger msg3 grant; and a MAC control element (CE) to indicate the network purpose of the RACH procedure is to send MBMS counting response message.

In an embodiment of the present invention, wherein the UE triggers the RACH procedure by sending a preamble set to indicate the network that the UE has enough buffer size accumulated for a msg3 and is therefore allocated with a larger msg3 grant; and accommodating MBMS counting response message in allocated grant for Msg3.

Further, the method comprises of terminating the MBMS counting on receiving a HARQ Ack from the network, which indicates a successful transmission of the msg3 is completed.

In an embodiment of the present invention, wherein the UE triggers the RACH procedure for sending the MBMS counting response message if the UE fulfill conditions for path-loss and msg3 buffer size.

Further, the method comprises of performing by the UE if the UE is in the idle mode, a probabilistic estimation on whether to participate in the MBMS counting operation; and wherein a probability factor which determines chances of participation for the UE is provided by at least one of indicating the probability factor in the MBMS counting request by the network based on current loading and/or previous statistic of a counting operation; and preconfigured or signaled as part of MBMS system or control information with at least one of possible values for the probability factor.

In an embodiment of the present invention, wherein the UE selects a time occasion to trigger the RACH procedure base on the probabilistic estimation.

In an embodiment of the present invention, wherein an identity field is provided in the MBMS counting response message for distinguishing different responses messages with respect to an originating PCell and/or PLMN.

In an embodiment of the present invention, wherein an identity field, which indicates MBMS counting procedure release version, is provided in the MBMS counting response message for distinguishing different counting response messages with respect to parallel or multiple counting request procedures corresponding to different release versions.

According to an embodiment of the present invention, a user equipment (UE) for operating multimedia broadcast multicast service (MBMS) counting, the UE is configured to receives an MBMS counting request from a wireless communication network; sends an MBMS counting response message on a dedicated path to the network, if the UE is in connected mode; and triggers a random access channel (RACH) procedure for sending the MBMS counting response message to the network, if the UE is in idle mode.

In an embodiment of the present invention, wherein the UE sets a radio resource control (RRC) connection request cause either as mobile originated (MO)-data or combined MO data-MBMS counting, depending on requirement of the UE to initiate a RRC connection.

According to an embodiment of the present invention, a method for enabling Multimedia Broadcast Multicast Service (MBMS) counting, the method comprising steps of receiving, by an User Equipment (UE), an MBMS counting request from a wireless communication network, sending, by one or more connected mode UEs, an MBMS counting response on a dedicated path to the network, triggering, by one or more Idle mode UEs, a Random Access Channel (RACH) procedure for sending the MBMS counting response, and setting, by the UE, a Radio Resource Control (RRC) connection request cause depending on the request reason set either as mobile originated (MO)-data or combined MO data-MBMS Counting depending on the UEs requirements to initiate the RRC connection.

According to an embodiment of the present invention, the method further comprises steps of evaluating, by the UE, a signal condition for sending MBMS counting response, wherein evaluating the signal condition comprises of comparing by the UE, the signal condition of the present signal with a preset threshold parameter received from the network, and sending, by the UE, an MBMS counting response message to the network if the evaluated signal condition is more than the preset threshold parameter.

In an embodiment of the present invention, the method further comprises of releasing, by the network, the RRC connection immediately after the reception of the MBMS counting response, if the RRC connection is established only for the MBMS Counting purpose as indicated in the RRC connection request cause. In another embodiment of the present invention, UE can utilize a MAC Control Element indicating the purpose of RACH as sending of Counting Response message in the Message 3 which carries RRC connection request.

In an embodiment of the present invention, the method further comprises of releasing, by the network, the RRC connection based on a data inactivity period, if the RRC connection is established for any reason involving MO-data for the sending of MBMS Counting Response message.

In an embodiment of the present invention, the one or more idle UEs triggers the RACH procedure by sending at least one of, but not limited to, a preamble set to indicate the network that the UE has more buffer size accumulated for a Msg3 and is therefore allocated with a larger msg3 grant, a MAC Control Element (CE) to indicate the network the purpose of the RACH procedure is to send MBMS Counting Response message, and the like, without departing from the scope of the invention. In an embodiment of the present invention entire MBMS Counting Response message can be accommodated within the received msg3 gram received.

In another embodiment of the present invention, the one or more idle UEs trigger the RACH procedure by sending at least one of, but not limited to, a preamble set to indicate the network that the UE has more buffer size accumulated for a Msg3 and is therefore allocated with a larger msg3 grant, accommodating MBMS Counting Response message in allocated grant for Msg3, and the like, without departing from the scope of the invention.

In an embodiment of the present invention, the method further comprises of terminating the MBMS counting on receiving a HARQ ACK from the network, when a successful transmission of the msg3 is completed.

In another embodiment of the present invention, the one or more idle mode UEs triggers the RACH procedure for sending the MBMS counting response only when the one or more idle mode UEs fulfill the conditions for the path-loss and the msg3 buffer size.

In another embodiment of the present invention, the method further comprises of performing by the one or more idle UEs, a probabilistic estimation on whether to participate in the counting operation; wherein a probability factor which determines the chances of participation for each UE is provided by at least one of, but not limited to, indicating the probability factor in the counting request message by the network based on current loading and/or previous statistic of a counting operation, reconfigured or signaled as part of MBMS system or control information with at least one of the possible values for the probability factor, and the like, without departing from the scope of the invention.

In an embodiment of the present invention, the probabilistic estimation enables the UE to select the time occasion to trigger the RACH operation in order to send the counting response message.

In an embodiment of the present invention, an identity field is provided in the counting response message from the UE for distinguishing different responses messages with respect to an originating PCell and/or PLMN. It is because Counting Request is broadcasted on the dedicated MBMS cell, which is part of common MBMS network or PLMN, whereas the UEs responding to the Counting Response message on the different PLMNs where their serving cells are located.

In an embodiment of the present invention, an identity field, which indicates MBMS Counting procedure release version, is provided in the counting response message from the UE for distinguishing different Counting Response messages with respect to parallel or multiple counting request procedures corresponding to different release versions.

The foregoing has outlined, in general, the various aspects of the invention and is to serve as an aid to better understand the more complete detailed description which is to follow. In reference to such, there is to be a clear understanding that the present invention is not limited to the method or application of use described and illustrated herein. It is intended that any other advantages and objects of the present invention that become apparent or obvious from the detailed description or illustrations contained herein are within the scope of the present invention.

The present invention claims benefit of the Indian Provisional Application No. 201641027771 titled "SYSTEM AND METHOD FOR MULTIMEDIA BROADCAST MULTICAST SERVICE (MBMS) OPERATION" filed on 14 Aug. 2016 by Samsung Electronics Co., Ltd, which is herein incorporated in its entirety by reference for all purposes.

The present invention provides a system and method for enabling Multimedia Broadcast Multicast Service (MBMS) counting. In the following detailed description of the embodiments of the invention, reference is made to the accompanying drawings that form a pan hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein and the various features and advantages details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

According to an embodiment of the present invention, a method for multimedia broadcast multicast service (MBMS) counting operation, the method comprises receiving, by an user equipment MBMS counting request from a wireless communication network; sending, by the UE, an MBMS counting response message on a dedicated path to the network, if the UE is in connected mode; and triggering, by the UE, a random access channel (RACH) procedure for sending the MBMS counting response message, if the UE is in idle mode.

Further, the method comprises of evaluating, by the UE, a signal condition for sending the MBMS counting response message, and wherein evaluating the signal condition comprises of comparing by the UE, the signal condition of a present signal with a preset threshold parameter received from the network; sending, by the UE, the MBMS counting response message to the network if the evaluated signal condition is more than the preset threshold parameter.

In an embodiment of the present invention, wherein the UE sets a radio resource control (RRC) connection request cause either as mobile originated (MO)-data or combined MO data-MBMS counting, depending on requirement of the UE to initiate a RRC connection, and wherein the RRC connection is released immediately after the network receives the MBMS counting response message, if the RRC connection is established only for the MBMS counting.

In an embodiment of the present invention, wherein the UE sets a radio resource control (RRC) connection request cause either as mobile originated (MO)-data or combined MO data-MBMS counting, depending on requirement of the UE to initiate a RRC connection, and wherein the RRC connection is released based on a data inactivity period, if the RRC connection is established not only for MBMS counting.

In an embodiment of the present invention, wherein the UE triggers the RACH procedure by sending a preamble set to indicate the network that the UE has enough buffer size accumulated for a Msg3 and is therefore allocated with a larger msg3 grant; and a MAC control element (CE) to indicate the network purpose of the RACH procedure is to send MBMS counting response message.

In an embodiment of the present invention, wherein the UE triggers the RACH procedure by sending a preamble set to indicate the network that the UE has enough buffer size accumulated for a msg3 and is therefore allocated with a larger msg3 grant; and accommodating MBMS counting response message in allocated grant for Msg3.

Further, the method comprises of terminating the MBMS counting on receiving a HARQ Ack from the network, which indicates a successful transmission of the msg3 is completed.

In an embodiment of the present invention, wherein the UE triggers the RACH procedure for sending the MBMS counting response message if the UE fulfill conditions for path-loss and msg3 buffer size.

Further, the method comprises of performing by the UE if the UE is in the idle mode, a probabilistic estimation on whether to participate in the MBMS counting operation; and wherein a probability factor which determines chances of participation for the UE is provided by at least one of indicating the probability factor in the MBMS counting request by the network based on current loading and or previous statistic of a counting operation; and preconfigured or signaled as part of MBMS system or control information with at least one of possible values for the probability factor.

In an embodiment of the present invention, wherein the UE selects a time occasion to trigger the RACH procedure base on the probabilistic estimation.

In an embodiment of the present invention, wherein an identity field is provided in the MBMS counting response message for distinguishing different responses messages with respect to an originating PCell and/or PLMN.

In an embodiment of the present invention, wherein an identity field, which indicates MBMS counting procedure release version, is provided in the MBMS counting response message for distinguishing different counting response messages with respect to parallel or multiple counting request procedures corresponding to different release versions.

According to an embodiment of the present invention, a user equipment (UE) for operating multimedia broadcast multicast service (MBMS) counting, the UE is configured to receives an MBMS counting request from a wireless communication network; sends an MBMS counting response message on a dedicated path to the network, if the UE is in connected mode; and triggers a random access channel (RACH) procedure for sending the MBMS counting response message to the network, if the UE is in idle mode.

In an embodiment a the present invention, wherein the UE sets a radio resource control (RRC) connection request cause either as mobile originated (MO)-data or combined MO data-MBMS counting, depending on requirement of the UE to initiate a RRC connection.

According to an embodiment of the present invention, a system and method far enabling Multimedia Broadcast Multicast Service (MBMS) counting is described herein. The present invention is described with respect to user equipment (UE) that includes any of the known communication devices, but not limited to, a mobile phone, PDA, tablet, TV, smart watch, smart glasses and the like, without departing, front the scope of the invention.

According to the present invention, the method comprises steps of receiving, by User Equipment (UE), data MBMS counting request from a wireless communication network. The network wishes to identify the count of devices/user equipments (UEs) that are availing or interested to receive certain MBMS services front the network and thus transmits MBMS counting request message to the UE. The UE receives the MBMS counting request from the wireless communication network. In an embodiment of the present invention, one or more UEs that are connected to the network receive the MBMS counting request from the network, wherein they are capable of receiving MBMS transmission from the network whether they are in idle state or connected state. In another embodiment of the present invention, all the UEs connected to the network receive the MBMS counting request from the network.

Further, the method comprises of evaluating, by the UE, a signal condition for sending MBMS counting response. Upon receiving the MBMS counting request from the wireless communication network, the UE attempts to transmit MBMS counting response to the wireless communication network, and thus evaluates the signal condition for sending the MBMS counting response. In an embodiment of the present invention, one or more UEs connected to the network evaluate the signal condition for sending the MBMS counting response. The threshold for the signal condition is either preconfigured or explicitly configured by the network. The threshold parameter can be provided in the MBMS configuration message and/or along with counting request message by the network. UE therefore compares the perceived signal conditions with the threshold and if signal conditions are found better than threshold, pursue the sending of the MBMS Counting Response message; otherwise, sending is not undertaken.

Further, the method comprises of sending, by one or more connected mode UEs, an MBMS counting response on a dedicated path to the network. One or more UEs, which are in connected mode, transmits MBMS counting response to the network on the dedicated path.

Further, the method comprises of triggering, by one or more Idle mode UEs, a RACH procedure for sending the MBMS counting response. As the one or more UEs which are in connected mode has already transmitted MBMS counting response to the network, the network will be expecting response from one or more idle mode UEs. The one or more idle mode UEs triggers RACH procedure for sending the MBMS counting response.

In an embodiment of the present invention, an identity field is provided in the counting response message from the UE for distinguishing different responses messages with respect to an originating PCell and/or PLMN. Since the MBMS reception is on a common MBMS network/PLMN which is shared among users of the different networks/PLMNs, in order to distinguish the serving cell (PCell) and/or PLMN of the particular UE, identity field(s) help in distinguishing the originating PCell and/or PLMN. This facilitates to determine the distribution of the MBMS users of different MBMs services across different cells and/or PLMNs.

In an embodiment of the present invention, the one or more idle UEs triggers the RACH procedure by sending at least one of, but not limited to, a preamble set to indicate the network that the UE has more buffer size accumulated for a Msg3 and is therefore allocated with a larger msg3 grant to carry a MAC Control Element (CE) to indicate the network the trigger of the RACH procedure and/or accommodating the MBMS Counting Response message, and the like, without departing from the scope of the invention. In an embodiment of the present invention, the one or more idle mode UEs triggers the RACH procedure for sending the MBMS counting response only when the one or more idle mode UEs fulfill the conditions for the path-loss and the msg3 buffer size.

In another embodiment of the present invention, one or more UEs triggering the RACH procedure further comprises of terminating the MBMS counting on receiving a HARQ ACK from the network, when a successful transmission of the msg3 is completed.

Further, the method comprises of setting, by the UE, a Radio Resource Control (RRC) connection request cause depending on the request reason set either as mobile originated (MO)-data or combined MO data-MBMS Counting depending on the UEs requirements to initiate the RRC connection.

In an embodiment of the present invention, the method further comprises of checking if the RRC connection is established for the MBMS Counting purpose. If yes, then the network releases the RRC connection immediately after the reception of the MBMS counting response. If the RRC connection is established for any other reason including general MO-data, then the network releases the RRC connection based on a data inactivity period.

In another embodiment of the present invention, the method further comprises of performing by the one or more idle UEs, a probabilistic estimation on whether to participate in the counting operation, wherein a probability factor which determines the chances of participation for each UE is provided by at least one of, but not limited to, indicating the probability factor in the counting request message by the network based on current loading and/or previous statistics of a counting operation, and preconfigured or signaled as part of MBMS system or control information with at least one of the possible values for the probability factor, without departing from the scope of the invention. In an embodiment of the present invention, the probabilistic estimation enables the UE to select the time occasion to trigger the RACH operation in order to send the counting response message.

FIG. 1 is a schematic flow diagram 100 illustrating a method for enabling Multimedia Broadcast Multicast Service (MBMS) counting, according to an embodiment of the present invention. According to the flow diagram 100, at step 102, user equipment (UE) receives an MBMS counting request from a wireless communication network. Further, at step 104, the UE evaluates a signal condition for sending MBMS counting response.

Further, at step 106, one or more UEs in connected mode send a MBMS counting response on a dedicated path to the network. Further, at step 108, one or more UEs ire Idle mode trigger a RACH procedure for sending the MBMS counting response. Further, at step 110, the UE sets an RRC connection request cause depending on request reason set either as mobile originated (MO)-data or combined MO-data and MBMS Counting, depending on the UEs requirements to initiate the RRC connection, if there is an established RRC connection.

FIG. 7 is a schematic flow chart 200 illustrating a method for evaluating signal condition for sending MBMS counting response, according to an embodiment of the present invention. User equipment (UE) performs evaluation of the signal condition to check whether MBMS counting response can be transmitted to a network or not. According to FIG. 2, at step 202, the UE evaluates the signal condition for sending MBMS counting response. Further at step 204, the UE receives threshold parameter for signal condition. In embodiment of the present invention, the threshold for the signal condition can be either preconfigured or explicitly configured by the network, without departing from the scope of the invention. In another embodiment of the present invention, threshold parameter can be provided in the MBMS configuration message and/or along with counting request message by the network, without departing from the scope of the invention.

Further, at step 206, the UE checks whether evaluated signal condition is better than threshold parameter. If yes, then at step 208, the UE sends the MBMS counting response message. If not, then at step 210 the UE does not send the MBMS counting response message to the network.

The counting mechanism can be useful for TV broadcast services. The present invention addresses the issues involved with counting in new system and provides new solutions. In an embodiment of the present invention, UEs, which are in connected mode, receive counting request on dedicated MBMS carrier, receive MBMS through dedicated eMBMS carrier (SCell), and send counting response messages through PCell uplink. another embodiment of the present invention, UEs which are in idle mode and that are having single receiver, receive service through standalone MBMS carrier, and are sparred from sending response in uplink. These UEs can send counting response through some other mechanism if they are equipped with, for instance, TV devices, having internet connectivity, and send out the responses utilizing HTTP links and so on. With the present method, the scope of receiving counting responses at the network is widened.

FIG. 3 is a schematic diagram 300 illustrating, message format for MBMS counting response message, according to an embodiment of the present invention. According to the FIG. 3, the MBMS counting response message comprises at least one of primary cell identifier (PCell Id) 302, PLMN identifier (PLMN Id) 304, release version for corresponding counting procedure 306, and one or more legacy fields 308. The person having ordinarily skilled in the art can understand that the one or more legacy fields 308 can include at least one of the fields which were transmitted by the UE to the network in legacy system, without departing from the scope of to invention.

In another embodiment of the present invention, it is considered that the idle mode UEs with dual RF receiver capability are involved in counting procedure to get a more accurate picture of service usage, and thereby resultant service provisioning can be enabled by the network. Further, the present method also monitors state transitions and power consumption while device is being asked for counting details. For example, if the UE battery is limited, then it can be allowed to not to respond with counting response. When the device is in idle mode, it triggers, a connection establishment by triggering an Initial Random Access Channel (RACH) procedure in order to send counting response.

In another embodiment of the present invention, as establishing RRC connection by a large number of idle mode UEs in order to send counting response messages will cause congestion or loading to the network, the present method provides a connection-less signaling approach for sending counting response message. In this approach, counting response message is sent as part of the msg3 of the RACH procedure. The person having ordinarily skilled in the art understands the structure of RACH procedure, msg3, and thus not described herein.

When successful transmission of msg3 is completed, which is interpreted from the HARQ ACK of the msg3 reception from the network, the procedure is concluded. That is, no farther message or operation or establishing the RRC connection is pursued, no RRC connection setup message transmission from the network is pursued. The UE remains in the idle mode and RACH procedure is considered as terminated. The objective of sending counting response message is therefore achieved without establishing the connection. In order to ensure that the UE is provided sufficient allocation size for the msg3 grant, it is required that the network is signaled about this. This is accomplished by a number of different ways: (a) UE chooses the preamble set such that the network gets informed by this choice of preamble set that the UE has more buffer (message size) accumulated for the Msg3 and is therefore allocated with larger msg3 grant. (b) a special preamble id is reserved for idle mode UEs to do RACH for the purpose MBMS counting response. This facilitates the network to know the purpose of the RACH and allocates sufficient size for the MSg3 grant. (c) Only those UEs which fulfill the conditions for the path-loss and msg3 buffer size considers doing RACH for the purpose of sending of counting response. Other UEs which do not fulfill these conditions do not undertake RACH. This results in to autonomously selection of the preamble set which provides for bigger allocation for msg3 grant.

FIG. 4 is a schematic flow diagram 400 illustrating a method for transmitting MBMS counting response message as part of random access channel (RACH) procedure, according to an embodiment of the present invention. According to the FIG. 4, at step 402, User equipment (UE) receives MBMS Counting Request from network. At step 404, the UE evaluates the condition for sending MBMS Counting Response. At step 406, UEs, which are in connected mode send the MBMS Counting Response immediately on dedicated path. At step 408, UEs, which are in idle mode trigger the RACH procedures in order to send the MBMS Counting response.

Further, at step 410, to send RACH procedure, the UE chooses one of the following:

At step 410a, the UE chooses the preamble set such that the network gets informed by this choice of preamble set that the UE has more buffer of message size accumulated for Msg3 and is therefore allocated with larger msg3 grant.

At step 410b, a special preamble id is reserved for idle mode UEs to do RACH for the purpose MBMS counting response. This facilitates the network to know the purpose of the RACH and allocates sufficient size for the MSg3 grant.

At step 410c, only those UEs which fulfill the conditions for the path-loss and msg3 buffer size considers doing RACH for the purpose of sending of counting response.

At step 412, the UE transmits MBMS counting response message in the received msg3 grant to the network. At step 414, the UE receives HARQ ACK of the received msg3 grant from the network confirming successful transmission of msg3, and thus successful transmission of MBMBS counting response message to the network from the UE.

Further, according to the present invention, the present system and method performs probabilistic estimation, according to an embodiment of the present invention. Since the number of the idle mode UEs may be large, the resultant RACH overload could be very high leading to network congestion and impact to the other UEs which are attempting RACH for other purposes. To overcome this, according to the present invention, the network can perform probabilistic estimation of the UEs availing the MBMS services from the limited sample or a subset of the total UEs.

Using limited sample or a subset of the total UEs, network scales the number of UEs to estimate the actual number of users for the respective services. For this purpose, each of the idle mode UEs can do some probability based decision whether to participate in the counting operation and consequently, only a limited number of the UEs actually participate, further limiting RACH load. The probability factor which determines the chances of participation for each UE is provided by at least one of the different ways as listed as:

Indication of probability factor in counting request message by network based on current loading and/or previous statistic of counting operation.

Preconfigured or signaled as part of MBMS system or control information with at least one of the possible values for the probability factor.

According to probabilistic approach, number of the UEs participating in RACH operation and therefore the RACH access load can be controlled. As an alternative approach, this is also achieved by making the UEs attempt RACH at different time occasions. For this purpose, the probability approach is used for each of the UE to select the time occasion to do RACH operation in order to send counting response message.

In another embodiment of the present invention, combination of both the approaches for probabilistic estimation for limited number of UEs doing RACH and doing RACH over different time occasions is applied. This leads to significant reduction in the RACH overload.

In another embodiment of the present invention, the present method provides a mechanism to accumulate, distinguish and process the Counting Responses received via different PCells, wherein the Peels are different belonging to different PLMNs/Operators. Also, co-ordination is needed across multiple networks to route responses properly and unambiguously on the new interfaces to the entity handling Counting Responses. Since 3GPP is coming up with several architecture solutions involving different arrangement of the network entities and interfaces, thereby requiring suitable handling, identification and routing of counting messages. The present invention provides an identify field within the counting response message which helps distinguishing the different responses messages with respect to its originating PCell and/or PLMN etc.

Furthermore, there may be complexity involved due to conflict in legacy counting procedure of the individual PLMNs's own legacy eMBMS with the new counting procedure on shared eMBMS network. That is there can be a mixed deployment scenario. An identification, for which counting procedures with respect to legacy or new, the concerned Counting response pertains to, is indicated in counting response message.

FIGS. 5a, 5b, and 5c are network diagrams 500, 530, 560 respectively, illustrating data flow between network elements, according to an embodiment of the present invention. According to the diagrams 5a, 5b, and 5c, the network comprises at least one of an EUTRAN, plurality of eNodeB, a management control entity (MCE), plurality of mobility management entity (MME), MBMS gateway MBMS-GW, plurality of primary gateway P-GW, plurality of secondary gateway S-GW, and a content provider.

According to FIGS. 5a, 5b, and 5c, during communication between the EUTRAN and the content provider, data transfer can be performed over different network elements forming different network connection. During forming the network connection, one or more network elements can be used as shared MBMS network elements, while other can belong to PLMN network elements.

According to the diagrams 5a, 5b, and 5c, two different MBSFN areas can respectively launch a counting procedure at the same time. Because of the use of Area index in counting response message, confusion can occur and eNB could be unable to determine the initiating MBSFN area. One of the approaches to avoid this is that this is handled by a network implementation. For instance, MCE or operations, administration and management (OAM) can coordinate the counting by avoiding parallel counting. However, coordination on network side to ensure that "no concurrent counting procedures are initiated at any location" is probably doable in one operator's PLMNs but, challenging across different operators PLMNs. In the present invention, it is possible that the dedicated MBMS carrier can be shared across different PLMNs of same or different operators. In such configurations, PCells of different PLMNs will share the dedicated eMBMS carrier for MBMS services. When counting request for such shared Scell is triggered, the counting response will be sent on respective PCell. It is possible that dedicated eMBMS cell areas and PCell MBMS areas can respectively launch counting procedure concurrently. The preset invention provides enhancement in the counting response message with identification fields to distinguish which MBSFN area/PLMN etc. is concerned with counting procedure and thereby help even parallel counting procedures to work concurrently.

According to legacy Release-10, MBMS counting response does not identify that MBMS Counting response is pertaining to which MBMS cell, i.e., it belongs to PCell or Dedicated MBMS Cell as area index is just numerical index value pointing to area id present in SystemInformationBlockType-13. According to the present invention, element containing the PLMN identity should be also indicated along with area index, so that network can easily distinguish that MBMS counting response belongs to PCell or Dedicated MBNS Cell.

In another embodiment of the present invention, it is provided to associate each of the counting response messages with the PCell and/or PLMN identity. For this purpose, additional fields are included for PCell Identity and/or PLMN Identity in counting response message. In Shared eMBMS network where the dedicated eMBMS carrier can be shared across operators as well, it may be necessary to find out under which operator/PCell area, there are more active MBMS service users. This information may be useful in terms of charging, shared EMBMS network (SEN) MBMS service provisioning and other statistical purposes.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to he taken in a limiting sense, and the scope of the present invention is defined only by the appended claims.

The invention claimed is:

1. A method for multimedia broadcast multicast service (MBMS) counting operation, the method comprising:
receiving, by a user equipment (UE), an MBMS counting request on a dedicated MBMS carrier from a wireless communication network;
sending, by the UE, an MBMS counting response message on a primary uplink carrier to the wireless communication network, if the UE is in connected mode; and
triggering, by the UE, a random access channel (RACH) procedure for sending the MBMS counting response message, if the UE is in idle mode.

2. The method of claim 1, wherein the UE sets a radio resource control (RRC) connection request cause either as mobile originated (MO)-data or combined MO data-MBMS counting, depending on requirement of the UE to initiate a RRC connection, and
wherein the RRC connection is released immediately after the network receives the MBMS counting response message, if the RRC connection is established only for the MBMS counting.

3. The method of claim 1, wherein the UE sets a radio resource control (RRC) connection request cause either as mobile originated (MO)-data or combined MO data-MBMS counting, depending on requirement of the UE to initiate a RRC connection, and wherein the RRC connection is released based on a data inactivity period, if the RRC connection is established not only for MBMS counting.

4. The method of claim 1, wherein the UE triggers the RACH procedure by sending:
a preamble set to indicate the network that the UE has enough buffer size accumulated for a Msg3 and is therefore allocated with a larger msg3 grant; and a MAC control element (CE) to indicate the network purpose of the RACH procedure is to send MBMS counting response message.

5. The method of claim 1, wherein the UE triggers the RACH procedure by sending:
a preamble set to indicate the network that the UE has enough buffer size accumulated for a msg3 and is therefore allocated with a larger msg3 grant; and
accommodating MBMS counting response message in allocated grant for Msg3.

6. The method of claim 5, further comprising, terminating the MBMS counting on receiving a HARQ Ack from the network, which indicates a successful transmission of the msg3 is completed.

7. The method of claim 1, wherein the UE triggers the RACH procedure for sending the MBMS counting response message if the UE fulfill conditions for path-loss and msg3 buffer size.

8. The method of claim 1, further comprising:
performing by the UE if the UE is in the idle mode, a probabilistic estimation on whether to participate in the MBMS counting operation; and
wherein a probability factor which determines chances of participation for the UE is provided by at least one of:
indicating the probability factor in the MBMS counting request by the network based on current loading and/or previous statistic of a counting operatic and preconfigured or signaled as part of MBMS system or control information with at least one of possible values for the probability factor.

9. The method of claim 8, wherein the UE selects a time occasion to trigger the RACH procedure base on the probabilistic estimation.

10. The method of claim 1, wherein an identity field is provided in the MBMS counting response message for distinguishing different responses messages with respect to an originating PCell and/or PLMN.

11. The method of claim 1, wherein an identity field, which indicates MBMS counting procedure release version, is provided in the MBMS counting response message for distinguishing different counting response messages with respect to parallel or multiple counting request procedures corresponding to different release versions.

12. A method for multimedia broadcast multicast service (MBMS) counting operation, the method comprising:
receiving, by a user equipment (UE), an MBMS counting request from a wireless communication network;
sending, by the UE, MBMS counting response message on a dedicated MBMS carrier to the wireless communication network by evaluating a signal condition for sending the MBMS counting response message, if the UE is in connected mode; and
triggering, by the UE, a random access channel (RACH) procedure for sending the MBMS counting response message, if the UE is in idle mode,
wherein sending, by the UE, an MBMS counting response message comprises:
comparing by the UE, the signal condition of a present signal with a preset threshold parameter received from the network; and
sending, by the UE, the MBMS counting response message to the network if the evaluated signal condition is more than the preset threshold parameter.

13. A user equipment (UE) for operating multimedia broadcast multicast service (MBMS) counting, comprising:
a transceiver; and
a processor configured to:
receive an MBMS counting request from a wireless communication network,
send an MBMS counting response message on a dedicated MBMS carrier to the wireless communication network, if the UE is in connected mode, and
trigger a random access channel (RACH) procedure for sending the MBMS counting response message to the network, if the UE is in idle mode,
wherein the processor is configured to set a radio resource control (RRC) connection request cause either as mobile originated (MO)-data or combined MO data-MBMS counting, depending on requirement of the UE to initiate an RRC connection, and
wherein the RRC connection is released immediately after the network receives the MBMS counting response message, if the RRC connection is established only for the MBMS counting.

* * * * *